N. D. LEVIN.
CONVEYER FOR LOADING MACHINES.
APPLICATION FILED MAR. 6, 1913. RENEWED MAY 4, 1917.
1,247,423.
Patented Nov. 20, 1917.
2 SHEETS—SHEET 1.
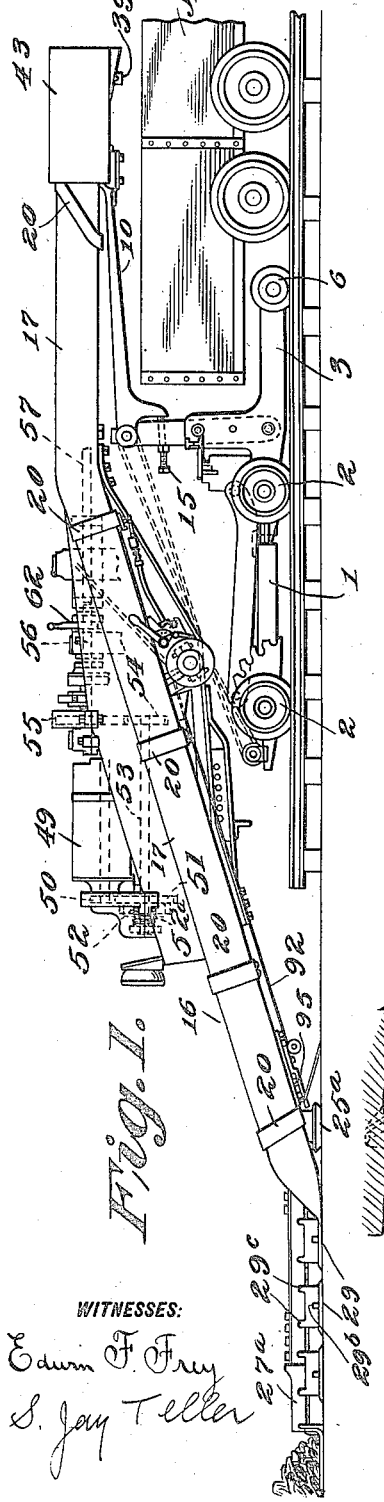
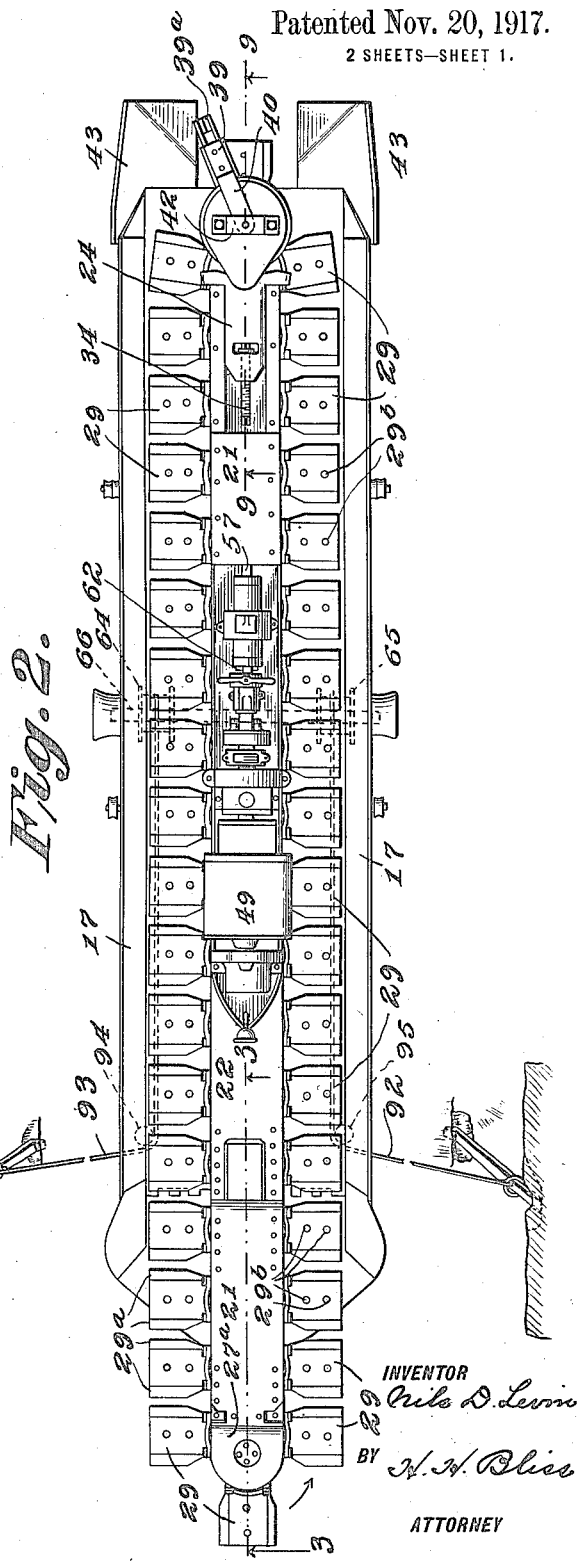
WITNESSES:
Edwin F. Frey
S. Jay Teller
INVENTOR
Nils D. Levin
BY H. H. Bliss
ATTORNEY

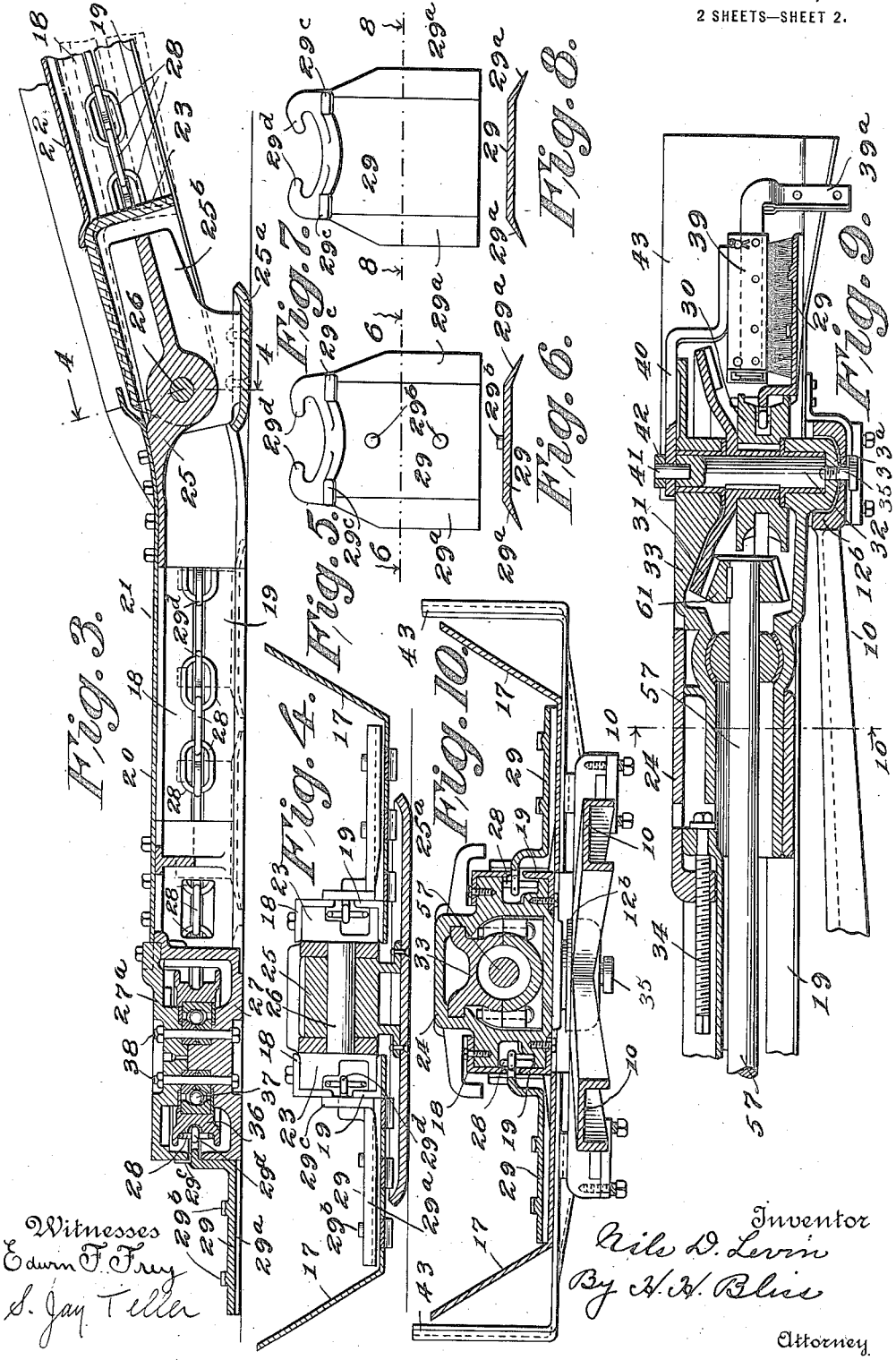

UNITED STATES PATENT OFFICE.

NILS D. LEVIN, OF COLUMBUS, OHIO, ASSIGNOR TO THE JEFFREY MANUFACTURING COMPANY, OF COLUMBUS, OHIO, A CORPORATION OF OHIO.

CONVEYER FOR LOADING-MACHINES.

1,247,423. Specification of Letters Patent. Patented Nov. 20, 1917.

Original application filed January 13, 1912, Serial No. 671,037. Divided and this application filed March 6, 1913, Serial No. 752,475. Renewed May 4, 1917. Serial No. 166,489.

*To all whom it may concern:*

Be it known that I, NILS D. LEVIN, a citizen of the United States, residing at Columbus, in the county of Franklin and State of Ohio, have invented certain new and useful Improvements in Conveyers for Loading-Machines, of which the following is a specification, reference being had therein to the accompanying drawings.

This invention relates to improvements in conveyers for loading machines of the type adapted for the gathering of coal or other loose material and delivering it into a car or other receptacle. Loaders of the class to which my invention relates are especially adapted for use in coal mines for loading the small pit cars or gondolas, but they are not necessarily limited to such use.

One of the objects of my invention is to provide a conveyer having carrier elements arranged to be forced laterally under the material to be handled to pick it up and carry it away. Another object is to provide in a conveyer an endless carrier having improved flights and improved means for supporting and driving them. A further object is to provide in a conveyer improved means for discharging material at one or more points. A further object is to provide an improved supporting frame for the endless carrier. Other objects will be apparent from the following specification and claims.

This application constitutes a division of my co-pending application for loading machines, filed January 13, 1912, Serial No. 671,037. In the said application I have shown and described in combination with the conveyer which constitutes the present invention, a supporting truck of a peculiar sort. I have also shown and described means mounted upon the conveyer frame for moving the frame during the operation of the machine to cause it to pick up material and also means for moving the conveyer bodily with respect to the truck to cause it to be supported thereon. The truck itself and the means for moving the conveyer bodily do not constitute parts of this invention and are herein shown and described only so far as is necessary for a clear understanding of the construction and operation of the conveyer itself. For a detailed description and showing of these features, reference can be had to the co-pending application above referred to.

This invention consists of the construction, arrangement and combination of parts set forth in the following description and claims in connection with the accompanying drawings which show the preferred form of the invention.

Of the drawings,

Figure 1 is a side elevation of the machine in operative position.

Fig. 2 is a plan view of the machine.

Fig. 3 is an enlarged vertical longitudinal section on the line 3—3 of Fig. 2.

Fig. 4 is an enlarged transverse section on the line 4—4 of Fig. 3.

Fig. 5 is an enlarged plan view of one of the flights of the conveyer.

Fig. 6 is an enlarged section on the line 6—6 of Fig. 5.

Fig. 7 is an enlarged view of a modified form of the flights.

Fig. 8 is an enlarged transverse section on the line 8—8 of Fig. 7.

Fig. 9 is an enlarged vertical section on the line 9—9 of Fig. 2.

Fig. 10 is an enlarged vertical section on the line 10—10 of Fig. 9.

Referring in detail to the construction illustrated, 1 designates the main frame or body part and 2, 2 the wheels of a truck designated to run upon track rails and to afford suitable support for the working parts of the loader. This truck has a rearward extension comprising side bars 3, which carry supplemental wheels 6. Secured to the framework of the truck is an arm or bracket 10 which extends rearward. This arm or bracket 10 is pivotally connected with the truck frame and can be adjusted with respect thereto by means of a screw 15.

The rear end of the bracket 10 forms a pivotal bearing support for the rear end of a conveyer which comprises an elongated frame designated as an entirety by 16. This frame consists of a pan part 17 which has flaring side walls and which is divided into two parallel troughs by the two parallel longitudinally extending chain guides, each of which consists essentially of an upper angle bar 18 and a lower angle bar 19, (see Figs. 4 and 10). The pan parts 17 and the angle bars 18 and 19 are rigidly connected by various transverse structural bars, plates and castings, such as the bars 20, plates 21 and 22 and castings 23 and 24, the casting 23 being at the lower end of the inclined part of the conveyer frame while the casting 24 is at its rear or discharge end.

The forward gathering end of the conveyer comprises a section which is pivotally connected with the main part of the conveyer frame. This front section of the frame has a casting 25 which is pivotally connected by means of a rod 26 to the frame casting 23 and carries a shoe 25$^a$ adapted to rest upon and slide over the ground. At the front end of the section there is a two-part casting 27, 27$^a$, and these castings 25, and 27, 27$^a$ are connected by the chain guide angle bars 18 and 19, the whole forming a rigid frame structure adapted to rest upon and follow the surface of the ground. This front frame section while pivotally connected to the main section is limited in its movement relative to the latter by a rearward extension 25$^b$ of the casting 25 which is adapted to engage the casting 23 on the main section.

The lower edge of the angle bars 18 is spaced from the upper edge of the angle bars 19, thus forming a slot in which the conveyer chain is guided. The chain is preferably formed of plain elongated ring links 28 together with the flights 29 which are interposed between the ring links at intervals and themselves constitute in effect links of the chain.

The conveyer flights 29 are of a peculiar form. Referring to Fig. 5 it will be noted that the flight consists essentially of a relatively flat and thin plate which is designed to move edgewise along the chain guides and within the conveyer troughs. In its preferred form the flight has its front and rear edges beveled at 29$^a$, as indicated in Figs. 5 and 6, and has its upper surface formed with one or more lugs or bosses 29$^b$. The bevel edges facilitate the movement of the flights under the material to be loaded and they also increase the frictional drag of the flights upon the material, as do also the lugs or bosses 29$^b$. It will be understood that other forms of the flight can be used to secure a similar result. For example, in some cases the flights can be made without the upstanding lugs 29$^b$, as shown in Figs. 7 and 8. At their inner sides the flights are formed with upstanding lugs 29$^c$, which are designed to rest against the chain guides, and adjacent these lugs are formed inward extending hooks 29$^d$, which extend through the slot of the chain guides and are connected to the ring links of the conveyer chain. Preferably three ring links are interposed between each adjacent pair of flights, as shown in Fig. 3.

At the delivery end of the conveyer the chain passes around a driving sprocket 30 which is mounted upon the hub of a bevel gear wheel 31, which wheel, in turn, is mounted upon and keyed to an upright shaft 32. This shaft is mounted in bearings in a support 33 comprising two castings bolted together as shown in Fig. 10. The support 33 is slidably mounted on the frame casting 24, being connected to said casting by an adjusting screw 34 by means of which the support can be adjusted longitudinally of the conveyer to vary the tension or take up slack of the chain. The casing 33 is formed on its lower side with a rounded boss 33$^a$ which rests loosely in a socket 12$^b$ in the rear end of bracket 10, the parts being secured in loose engagement by means of a screw bolt 35. In this way the conveyer frame is connected and supported at its rear end by the bracket or arm 10 with freedom to swing laterally and to rise and fall.

At the front end of the conveyer the chain passes around an idler sheave or sprocket wheel 36 which is preferably mounted upon ball bearings 37 carried by the casting parts 27, 27$^a$, the part 27$^a$ being secured to the main part 27 of the casting by bolts 38. The casting parts 27, 27$^a$ are preferably shaped to form a semicircular continuation of the chain guide formed by the angle bars 18, 19. In this way the flights of the conveyer are firmly supported as they pass around the front end or nose of the conveyer. This firm support is needed because the material is taken on the flights as they move around the forward extension of the conveyer frame and it is essential that the flights be held firmly to the work in order that they may be forced under the material to be loaded. It will be noted on referring to Fig. 2 that the pan part of the conveyer frame is cut away at the front end of the machine so as to expose the flights as they move around the front pivoted extension and enable them to advantageously attack the mass of material which is to be taken on and conveyed to the point of discharge. The pan structure is cut away similarly on both sides so that the conveyer can be swung on its rear pivotal support either to the right or to the left to advance the flights against the material, it being understood that the conveyer chain is driven in one direction when the machine is swung to the left and in the opposite direction when the machine is swung to the right. By connecting the conveyer flights to the chain at their inner edges, and in such manner that the chain lies wholly above the lowermost bounds of the material engaging parts of the flights, the latter are especially adapted to be moved edgewise over the ground and under the material to be loaded as they traverse the front ground supported part of the conveyer frame.

At the rear or discharge end of the conveyer also the pan part of the frame is cut away so that the flights are freely exposed on all sides as they pass around the rear side of the driving sprocket wheel 30. As the flights move around the sprocket wheel they are separated from each other so that much of the material carried upon the flights will fall of its own accord from the conveyer. But to insure the discharge of all the material an adjustable knock-off device is provided. This is preferably in the form of a metal brush 39 mounted on the end of a swinging arm 40 and disposed so as to lie directly over the flights as they pass around the driving sprocket wheel and scrape from the flights any material that does not fall of its own accord. The arm 40 is pivotally mounted on a pin 41 carried by shaft 32 and a plate 42. The brush 39 carries a depending arm 39$^a$ arranged to swing between and engage the inner edges of aprons 43, 43 which are secured to the conveyer frame as shown in Figs. 2 and 9 and serve to keep the discharge of material within suitable bounds. The conveyer flights tend to drag the knock-off brush with them in their movement so that the brush is held with its stop arm 39$^a$ against one or the other of the aprons 43 according to the direction of movement of the flights; and when the movement of the flights is reversed the brush is automatically swung from one side to the other and is therefore always in suitable position to effect the discharge of material from the conveyer.

When the machine is in operative position, as shown in Fig. 1, the conveyer frame is supported from the truck at one point only, namely, at the rear end of the arm or bracket 10, the front end of the conveyer frame resting upon the ground. But when the machine is being moved from place to place it is necessary that the conveyer frame be carried entirely by the truck. The means for adjusting the truck for transporting the machine from place to place and for moving the conveyer bodily with respect to the truck, are, as above stated, fully shown and described in my before mentioned co-pending application and need not therefore be described here.

The power mechanism which I employ to drive the conveyer chain and to feed the machine is mounted entirely upon the swinging conveyer frame. 49 is a motor, preferably an electric motor, though a compressed air or other engine may be employed. The motor is suitably supported from the frame of the conveyer with the axis of its armature shaft extending longitudinally of the conveyer frame. 57 is a drive shaft for the moving parts of the conveyer. It is provided at its rear end with a bevel pinion 61 which meshes with the gear 31 before described. At the other end of the shaft 57 there is a clutch 62 the driving element of which is mounted upon a shaft 56 in alinement with the shaft 57. The shaft 56 carries a gear 55, which meshes with a pinion 54 on a countershaft 53. On the countershaft 53 there is a gear 51 which meshes with a gear 50 on the armature shaft of the motor 49. The gear 51 is not rigidly connected to the shaft 53 but is connected by means of a friction power transmitting device 52 which can be adjusted by means of a spring 52$^a$. It will be clear that by opening the clutch 62 the motor can be caused to run free without driving the conveyer.

For moving the conveyer laterally about its pivot to bring the flights into engagement with the material to be loaded, winding drums 64 and 65 are provided. These are mounted on a transverse shaft 66 and are connected to the motor 49 by means of power transmitting gearing which need not be here described in detail. It is sufficient to say that clutches are provided by means of which either drum can be driven at the will of the operator. Mounted upon the drums 64 and 65 are cables 92 and 93. These cables pass forward and around guide sheaves 94 and 95 on the under side of the conveyer frame from which they can be extended the one toward the left and the other toward the right and made fast to an anchor, jack or the like. When one of the cables is thus arranged and connected it is clear that the rotation of its winding drum will cause the swinging of the conveyer frame toward the anchor or jack to which the cable is secured.

In operation after the machine has been put in position, as shown in Fig. 1, the cables 92 and 93 are carried out and made fast on the left and on the right, respectively. A coal car, shown at A in Fig. 1, is then run into the position shown with the delivery end of the conveyer extending well over the car. Then, assuming that the conveyer is to be swung first toward the left, the motor will be started in a direction to cause the flights of the conveyer to travel in the direction indicated by the arrow in Fig. 2. The operator then connects the motor with the winding drum 64 causing the latter to wind up the cable 92 and draw the front end of the conveyer to the left, the said conveyer being free to swing upon the pivotal support at its rear end. During this movement the winding drum 65 is free to turn so that the cable 93 will be paid out as the machine swings.

As the conveyer flights move forward and around the front section or nose of the conveyer they are forced edgewise under the coal and drag it along upon themselves into and up the inclined trough of the conveyer frame to the rear end thereof where it falls or is knocked from the flights as they swing around the driving sprocket. Inasmuch as the frictional drag of the flights on the ground is greater as they move along the left or advance side of the front section or nose of the machine than as they move along the right or rear side of the machine, the flights in the former case being loaded with the coal while in the latter case they are not, there is a constant tendency to draw the machine endwise toward the coal and it is thus held automatically up to the work.

When the machine has swung as far as possible, or as far as desired, toward the left, the motor is reversed so as to reverse the direction of travel of the conveyer flights and the connections are changed to cause the right cable 93 to be wound upon the drum 65 and the machine to be swung toward the right. Thus the machine can be swung alternately to the left and to the right until the coal has all been loaded, it being understood, of course, that a car when filled is replaced by an empty car. In reversing the movement of the flights the knock-off brush is automatically swung from one side to the other, as before explained.

It will be observed that the power of the driving motor is transmitted to the conveyer flights through the friction clutch 52 which can be adjusted to give way under any desired load so that the conveyer parts are protected from breakage.

What I claim is:

1. The combination with a bodily movable loading conveyer having a chain and plate-like flights connected to the chain in position to be moved edgewise under the material to be loaded, of means for forcing the conveyer against the material to be loaded.

2. In a conveyer for a loader, the combination of a conveyer chain, plate-like flights connected to said chain so as to move edgewise under the material to be loaded and a trough in which the flights move, said trough being cut away at the receiving end of the conveyer to expose the flights and permit them to move under the material to be loaded.

3. In a conveyer for a loader, the combination of a movably mounted frame formed with a trough, a traveling carrier arranged to run in said trough and comprising a chain having plate-like flights adapted to move edgewise under the material to be loaded, said trough being cut away at the receiving end of the conveyer to expose the flights and permit them to move under the material to be loaded, and means for feeding the frame to advance the conveyer to the work.

4. A conveyer for a loader having a chain, and edgewise moving separated plate-like flights carried by the chain, said flights having parts of their upper surfaces projecting above the front edges thereof.

5. A conveyer for a loader comprising an elongated frame, an endless flight carrier mounted on said frame and adapted to discharge material at one end thereof where the flights change the direction of their movement, and a knock-off device coöperating with the flights, said device being adjustable to vary the point at which the material is discharged from the flights.

6. A conveyer for a loader comprising an elongated frame, an endless carrier thereon having plate-like edgewise moving flights, and a normally stationary knock-off device under which the flights move at the point of discharge.

7. A conveyer for a loader comprising an elongated frame, an endless carrier thereon having plate-like edgewise moving flights, and a knock-off device under which the flights move at the point of discharge, said device being adjustable to vary the point of discharge.

8. A conveyer for a loader comprising an elongated frame having two parallel guides, sprocket wheels mounted at the ends of said guides, a chain moving in said guides and around said sprocket wheels, plate-like edgewise moving flights carried by the chain, a swinging knock-off plate at the discharge end of the conveyer under which the flights move, and means for securing the knock-off plate in different angular positions to vary the point of discharge.

9. In a conveying apparatus for loading material, the combination of a chain, means for guiding the chain in opposite directions along two parallel paths and from one of the said paths to the other, plate-like edgewise-moving flights connected to the chain so as to be separated as the chain moves from one of the said paths to the other whereby the flights are moved in succession edgewise under the material to be loaded, and means for forcing the conveyer against the material.

10. A conveyer for a loader comprising an elongated frame having two parallel guides, the said frame being formed in front and rear parts hinged together for movement about a transverse horizontal axis, the said front part resting directly upon the ground, a ground-engaging support for the said rear part adjacent the point of pivotal connection, a relatively elevated support for the other end of the last said part, a chain movable longitudinally of the said frame parts following the said parallel guides, and plate-like flights carried by the chain and movable edgewise over the ground and under the material to be loaded while traversing the said front part of the frame.

11. A loading conveyer having an endwise moving chain and plate-like flights connected at their inner edges to the chain and projecting laterally therefrom in position to be moved edgewise under the material to be loaded.

12. A loading conveyer having an endwise moving chain and plate-like flights connected to the chain and projecting laterally therefrom in position to be moved endwise under the material to be loaded, the chain lying wholly above the lowermost bounds of the material engaging parts of the flights.

In testimony whereof I affix my signature in the presence of two witnesses.

NILS D. LEVIN.

Witnesses:
Jos. Webster,
Dudley T. Fisher.